United States Patent [19]
Tokumaru et al.

[11] Patent Number: 5,611,015
[45] Date of Patent: Mar. 11, 1997

[54] APPARATUS AND METHOD OF SPLICING POLARIZATION-MAINTAINING OPTICAL FIBERS

[75] Inventors: Yuzo Tokumaru; Mikio Kobayashi, both of Yokohama, Japan

[73] Assignee: Sumitomo Electric Industries, Ltd., Osaka, Japan

[21] Appl. No.: 542,302

[22] Filed: Oct. 12, 1995

[30] Foreign Application Priority Data

Oct. 13, 1994 [JP] Japan .................................. 6-247853

[51] Int. Cl.⁶ .................................................. G02B 6/255
[52] U.S. Cl. .................................................. 385/98
[58] Field of Search ............................. 385/95–99, 147

[56] References Cited

U.S. PATENT DOCUMENTS

| | | | |
|---|---|---|---|
| 4,911,524 | 3/1990 | Itoh et al. | 385/97 |
| 5,013,345 | 5/1991 | Itoh et al. | 65/407 |
| 5,159,481 | 10/1992 | Maeda | 359/189 |
| 5,225,925 | 7/1993 | Grubb et al. | 359/341 |
| 5,481,321 | 1/1996 | Lipton | 359/465 |

FOREIGN PATENT DOCUMENTS 62-272207  11/1987  Japan .

OTHER PUBLICATIONS

Patent Abstracts of Japan, vol. 15, No. 59 (P–1165), Feb. 13, 1991 & JP-A-02 287504 (Fujikura Ltd), Nov. 27, 1990.
Patent Abstracts of Japan, vol. 12, No. 156 (P–701), May 13, 1988 & JP-A-62 272207 (Fujikura Ltd; Others: 01), Nov. 26, 1987.
Patent Abstracts of Japan, vol. 9, No. 93 (P–351), Apr. 23, 1985 & JP-A-59 219707 (Fujikura Densen KK), Dec. 11, 1984.
Patent Abstracts of Japan, vol. 9, No. 210 (P–383), Aug. 28, 1985 & JP-A-60 070407 (Sumitomo Denki Kogyo KK; Others: 01) Apr. 22, 1985.

*Primary Examiner*—Akm E. Ullah
*Attorney, Agent, or Firm*—Cushman Darby & Cushman, IP Group of Pillsbury Madison & Sutro, LLP

[57] ABSTRACT

A TV camera picks up images of the first and second polarization-maintaining optical fibers, while light is irradiated to their side. First and second values are calculated based on the luminance peaks of the images by using an image processing unit connected to the TV camera. The axes of respective cores and respective stress applying members of the polarization-maintaining optical fibers can be easily aligned by moving the fibers such that the first and second values displayed on said display are equal.

10 Claims, 7 Drawing Sheets

X DIRECTION

Fig. 9B

Y DIRECTION

APPARATUS AND METHOD OF SPLICING POLARIZATION-MAINTAINING OPTICAL FIBERS

BACKGROUND OF THE INVENTION

1. Field of the Invention

The present invention relates to an apparatus and a method of fusion-splicing polarization-maintaining optical fibers.

2. Related Background Art

Optical fiber splicers has been described in U.S. Pat. Nos. 4,506,947, 4,690,493, 4,914,797, 5,002,351, 5,011,259, and 5,218,184, and Japanese Patent Laid-Open No. 2-287504.

SUMMARY OF THE INVENTION

When light is irradiated to two opposing optical fibers from a lateral side, transmitted optical images of the respective fibers can be obtained. These fibers can be aligned by moving them such that the positions of the luminance peaks of the respective transmitted optical images coincide.

However, when two optical fibers are aligned by setting the positions of their luminance peaks to coincide with each other while visually observing the luminance peaks, the axes of the optical fibers after alignment sometimes do not coincide with each other depending on the individual difference of the operator. When these optical fibers are spliced, the axes of the spliced optical fibers are sometimes misaligned from each other by a maximum of about 4°.

The present invention has been made in view of the above problem, and has as its object to provide a method of fusion-splicing polarization-maintaining optical fibers, wherein the polarization-maintaining optical fibers can be spliced without being comparatively influenced by differences in individual operators. According to this method, the positions of the luminance peaks of the respective optical fibers are displayed on a display in the form of numerical values, and these numerical values are set to be equal to each other, thereby aligning the optical fibers.

More specifically, according to the present invention, there is provided a polarization-maintaining optical fiber fusion-splicing method of fusion-splicing first and second polarization-maintaining optical fibers, each having a core and stress applying members in a cladding layer, comprising arranging the first and second polarization-maintaining optical fibers such that end faces thereof oppose each other, irradiating light from a side of the first and second polarization-maintaining optical fibers, sensing a first transmitted optical image transmitted through the first polarization-maintaining optical fiber and a second transmitted optical image transmitted through the second polarization-maintaining optical fiber with a television camera, obtaining, on the basis of a luminance signal of the first luminance signal output from the television camera, positions of first, second, and third luminance peaks of the first transmitted optical image sensed in correspondence with the positions of the core and the stress applying members of the first polarization-maintaining optical fiber, obtaining, on the basis of a luminance signal of the second luminance signal output from the television camera, positions of fourth, fifth, and sixth luminance peaks of the second transmitted optical image sensed in correspondence with the positions of the core and the stress applying members of the second polarization-maintaining optical fiber, displaying a first value calculated from the positions of the first, second, and third luminance peaks on a display, displaying a second value calculated from the positions of the fourth, fifth, and sixth luminance peaks on the display, moving the first and second polarization-maintaining optical fibers such that the first and second values displayed on the display are equal, thereby aligning the first and second polarization-maintaining optical fibers with each other, and thereafter fusion-splicing the first and second polarization-maintaining optical fibers with each other.

In the present invention, since the first and second values corresponding to the positions of the fibers are displayed on the display, and the positions of the first and second fibers are set to coincide with each other quantitatively. Thus, alignment in fusion splicing of the first and second fibers can be performed without being influenced by the differences in individual operators. If the distributions of the respective luminances are displayed on the display, the positions of the luminance peaks can be visually set to coincide with each other. The first value can be calculated by obtaining the ratio of a difference between the positions of the first and second luminance peaks to a difference between the positions of the first and third luminance peaks. In this case, the second value can be calculated by obtaining the ratio of a difference between the positions of the fourth and fifth luminance peaks to a difference between the positions of the fourth and sixth luminance peaks.

An apparatus according to the present invention comprises means for practicing this method.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

A preferred embodiment of the present invention will be described with reference to the accompanying drawings. Note that the same or identical elements are denoted by the same reference numerals, and a repetitive explanation will be omitted.

Figure 1A:
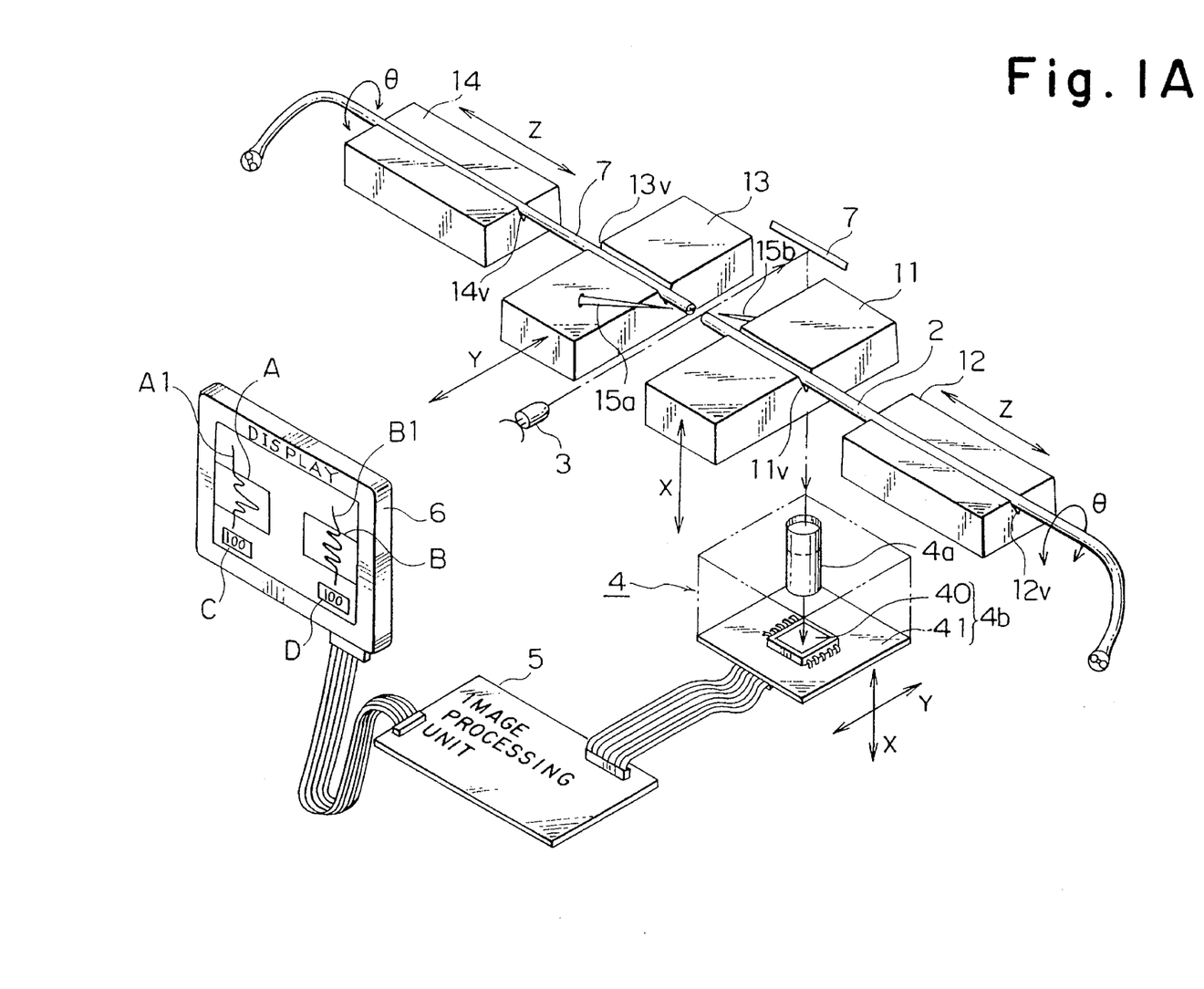
FIG. 1A shows an apparatus according to an embodiment of the present invention.
Figure 1B:
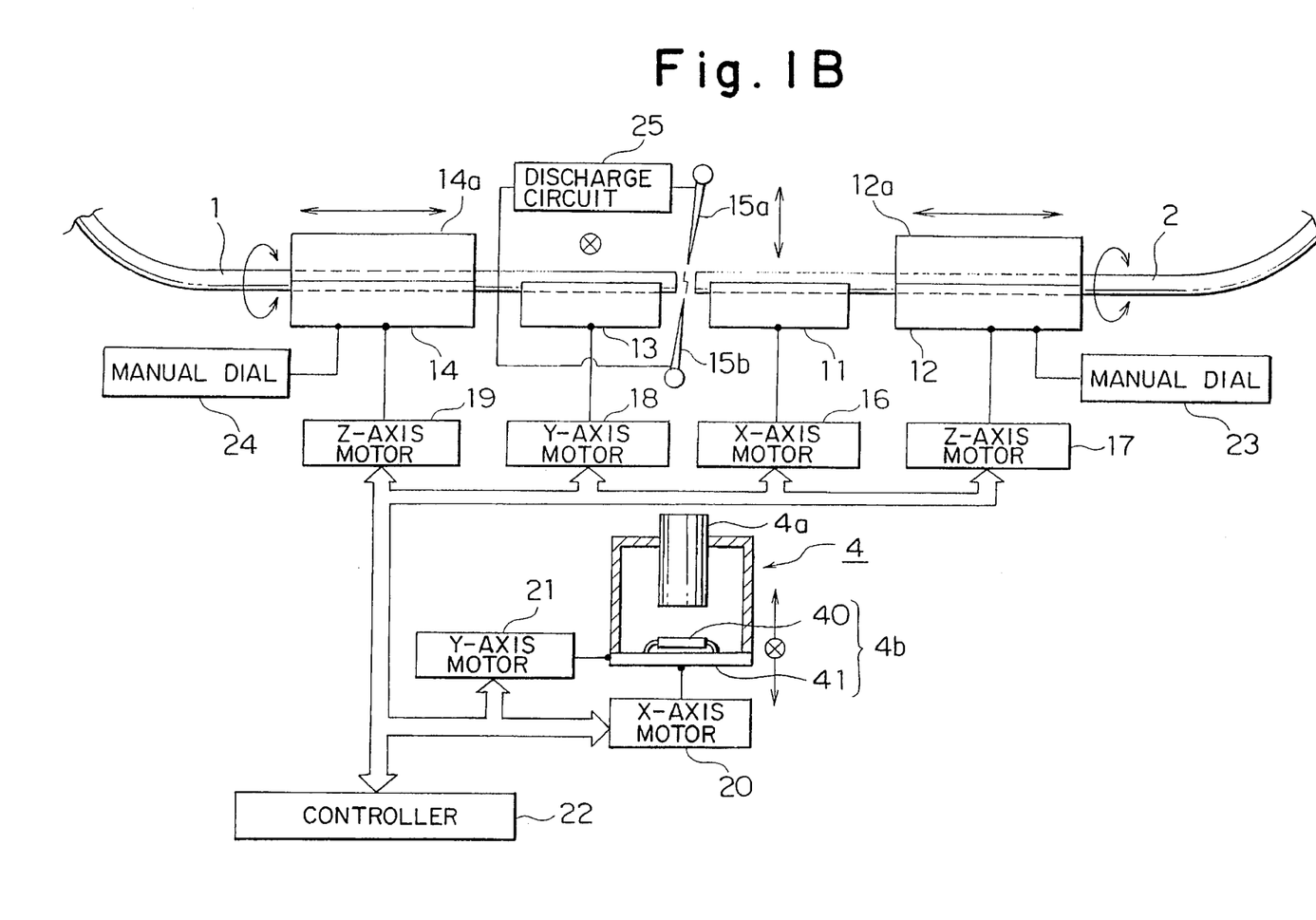
FIG. 1B shows the mechanical structure of the apparatus shown in FIG. 1A.

FIG. 1A shows an apparatus according to this embodiment. FIG. 1B shows the mechanical arrangement of the apparatus shown in FIG. 1A. FIGS. 2 to 13 show the arrangement of this apparatus and a polarization-maintaining optical fiber splicing method employing this apparatus.

The apparatus shown in FIGS. 1A and 1B has rest tables 11 and 12 on which a polarization-maintaining optical fiber 1 is set, and rest tables 13 and 14 on which a polarization-maintaining optical fiber 2 is set. The respective rest tables 11 to 14 have V-grooves 11v to 14v. The polarization-maintaining optical fibers 1 and 2 are set in the V-grooves 11v to 14v of these rest tables 11 to 14, as shown in FIG. 1A.

This apparatus has a light source 3, e.g., a light-emitting diode, a mirror 7, a television camera 4, an image processing unit 5, a liquid crystal display 6, and a pair of discharge electrodes 15a and 15b.

The television camera 4 and the rest tables 11 to 14 are movable in directions indicated by arrows in FIG. 1A. In the following description, note that X-, Y-, and Z-axes are orthogonal, and a θ direction is defined as rotation about the Z-axis as the rotation axis. The Z-axis coincides with the horizontal axis, and the X-axis coincides with the vertical axis. The V-grooves 11v to 14v of the respective rest tables 11 to 14 extend in the Z-axis direction.

The rest table 11 is moved by a motor 16 in the X-axis direction. The rest table 12 is moved by a motor 17 in the Z-axis direction. The rest table 13 is moved by a motor 18 in the Y-axis direction. The rest table 14 is moved by a motor 19 in the Z-axis direction. The television camera 4 is moved by a motor 20 in the X-axis direction and by a motor 21 in the Y-axis direction. These motors 16 to 21 are controlled by a controller 22.

The upper surface of the rest table 12 is covered with the lower surface of a press member 12a. The optical fiber 2 is sandwiched between the rest table 12 and press member 12a and fixed on the rest table 12. The upper surface of the rest table 14 is covered with the lower surface of a press member 14a. The optical fiber 1 is sandwiched between the rest table 14 and press member 14a and fixed on the rest table 14. The rest tables 12 and 14 are rotated in the θ direction by manually rotating manual dials 23 and 24, respectively.

The discharge electrodes 15a and 15b are arranged to form a space surrounded by the opposite end faces of the rest tables 11 and 13. In other words, the discharge electrodes 15a and 15b are arranged in the vicinities of the end faces of the fibers 1 and 2. The discharge electrodes 15a and 15b are connected to a discharge circuit (high-voltage generating circuit) 25 including a capacitor. When a high voltage is applied across the discharge electrodes 15a and 15b by the discharge circuit 25, electric discharge occurs. The end portions of the fibers 1 and 2 are fused or melted and spliced by this electric discharge.

This apparatus will be described in more detail.

Figure 2:
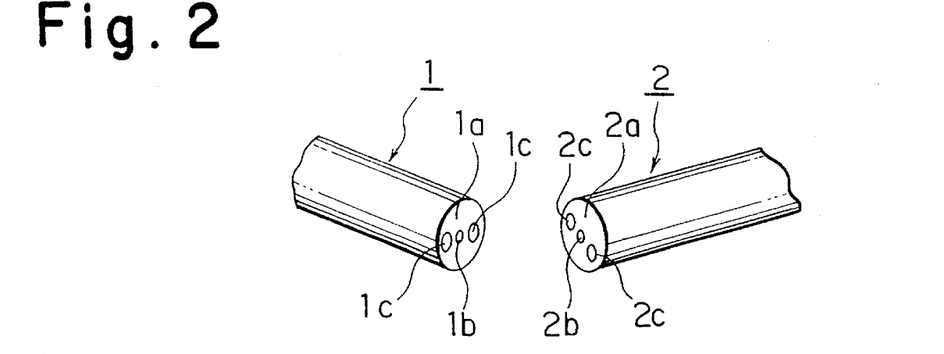
FIG. 2 shows two polarization-maintaining optical fibers.

FIG. 2 shows the first polarization-maintaining optical fiber 1 having a core 1b and stress applying members 1c in its cladding layer 1a, and the second polarization-maintaining optical fiber 2 having a core 2b and stress applying members 2c in its cladding layer 2a.

Figure 3:
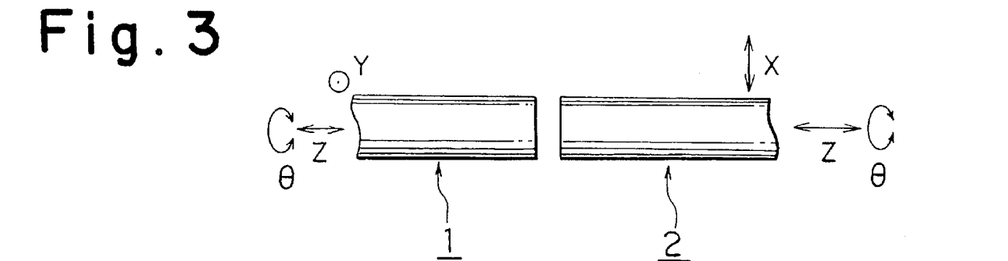
FIG. 3 shows polarization-maintaining optical fibers that oppose each other.

As shown in FIG. 3, the first and second polarization-maintaining optical fibers 1 and 2 are arranged such that their end faces oppose each other.

Figure 4:
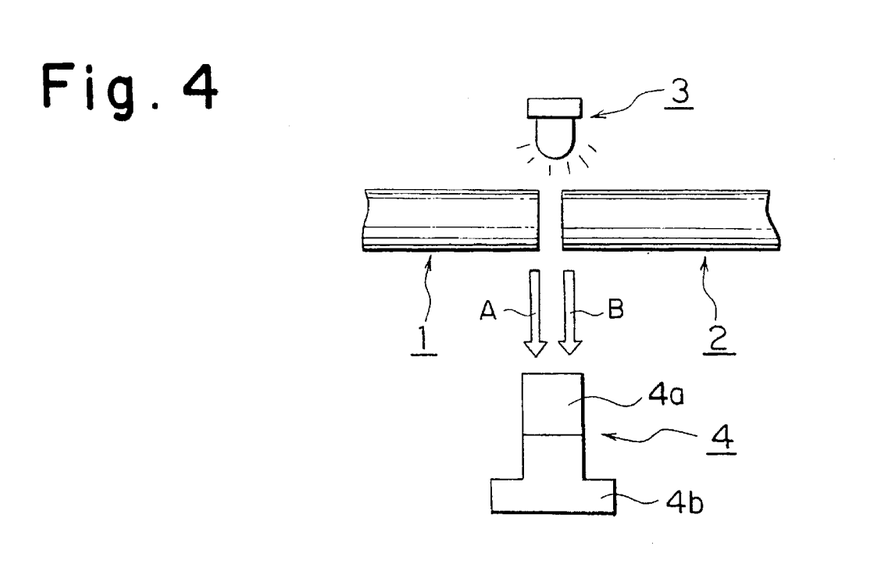
FIG. 4 shows part of the apparatus shown in FIG. 1A.

As shown in FIG. 4, light is irradiated toward the first and second polarization-maintaining optical fibers 1 and 2 from the LED 3 arranged on a side of the first and second polarization-maintaining optical fibers 1 and 2, and a first transmitted optical image transmitted through the first polarization-maintaining optical fiber 1 and a second transmitted optical image transmitted through the second polarization-maintaining optical fiber 2 are sensed by the television camera 4.

The television camera 4 consists of a microscope 4a and a CCD camera 4b arranged on the optical axis of the microscope 4a. The CCD camera 4b has a CCD sensing element 40 and a drive circuit 41 for it. Hollow arrows A and B in FIG. 4 respectively indicate the first and second transmitted optical images.

Figure 5:
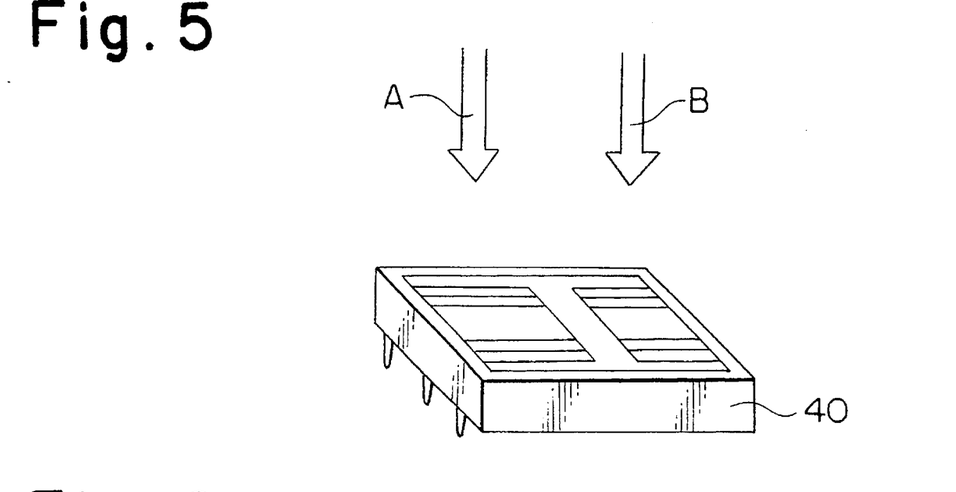
FIG. 5 shows a CCD solid-state sensing element.

When the first and second transmitted optical images A and B are sensed by the television camera 4, they are projected on the sensing surface of the CCD sensing element 40 arranged in the CCD camera 4b, as shown in FIG. 5.

Figure 6:
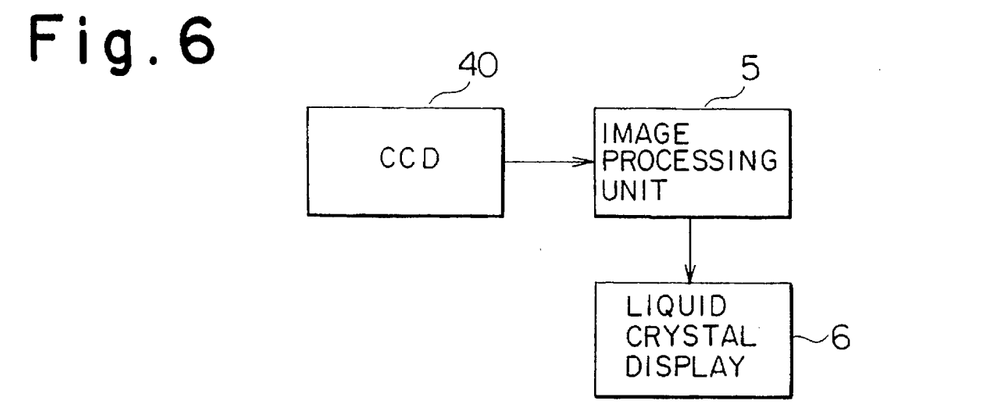
FIG. 6 shows part of the apparatus shown in FIG. 1A.

A video signal output from the CCD sensing element 40 includes a luminance signal. As shown in FIG. 6, this video signal is input to the image processing unit 5.

Based on the video output of the first transmitted optical image A output from the CCD sensing element 40, the image processing unit 5 calculates the positions of the first to third luminance peaks sensed in accordance with the positions of the core 1b and stress applying members 1c of the first polarization-maintaining optical fiber 1. Also, based on the video output of the second transmitted optical image B output from the CCD sensing element 40, the image processing unit 5 calculates the positions of the fourth, fifth, and sixth luminance peaks sensed in accordance with the positions of the core 2b and stress applying members 2c of the second polarization-maintaining optical fiber 2. This will be described in detail later.

Figure 7:
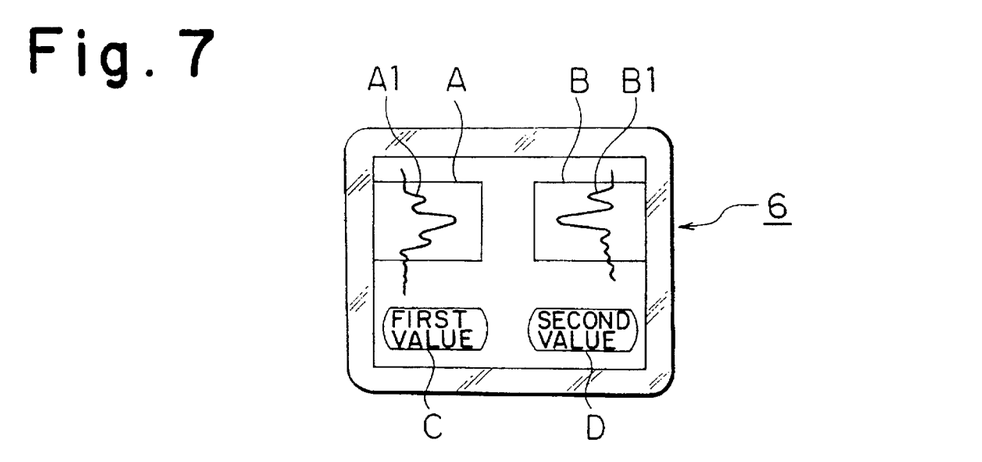
FIG. 7 shows a display displaying polarization-maintaining optical fibers and numerical values.

Furthermore, the image processing unit 5 outputs, to the liquid crystal display 6, the first value calculated from the positions of the first, second, and third luminance peaks. The image processing unit 5 also outputs, to the liquid crystal display 6, the second value calculated from the positions of the fourth, fifth, and sixth luminance peaks. Accordingly, the liquid crystal display 6 displays a first value C and a second value D, as shown in FIG. 7.

The signals output from the image processing unit 5 and corresponding to luminance distributions A1 and B1 of the first and second transmitted optical images A and B are superimposed on the video signals output from the CCD sensing element 40 and corresponding to the first and second transmitted optical images A and B, and resultant signals are input to the liquid crystal display 6. The signals to be input to the display 6 are further superimposed with signals indicating the first and second values output from a character generator arranged in the image processing unit 5. Accordingly, the display 6 displays the first and second transmitted optical images A and B, the luminance distributions A1 and B1, and the first and second values C and D.

The first and second values C and D respectively correspond to the positions of the first and second fibers 1 and 2.

Therefore, the operator moves the first and second polarization-maintaining optical fibers 1 and 2 such that the first and second values C and D displayed on the display 6 are equal, thereby aligning the first and second polarization-maintaining optical fibers 1 and 2. The fibers 1 and 2 are moved by driving the motors shown in FIG. 1B or by rotating the corresponding dials.

After the first and second values C and D are set equal to each other, the polarization-maintaining optical fibers 1 and 2 are fused, thereby splicing the optical fibers 1 and 2 such that their optical axes coincide.

In this embodiment, the positions of the fibers 1 and 2 can be quantitatively determined by the operator, as described above. Thus, the polarization-maintaining optical fibers 1 and 2 can be spliced without being influenced by the differences in individual operators. The apparatus of this embodiment was fabricated on the experimental basis, and the splicing method in which quantitativeness was introduced into alignment was actually experimented. It became obvious that this splicing method could be operated considerably easily when compared to a conventional fiber fusion splicer. The easy operability of this method is obtained since the first and second values C and D are displayed. The improvement in operational efficiency obtained by this value indication is probably based on the human engineering but its detailed analysis is difficult to make theoretically. However, the experiment of the splicing method of this embodiment in which quantitativeness was introduced obviously exhibited improvement in easy operability and operational efficiency. The improvement in operational efficiency achieved by employment of the arrangement of this embodiment was not anticipated at all.

This embodiment will be described in more detail.

How to move the first and second polarization-maintaining optical fibers 1 and 2 will be described. As shown in FIG. 3, the first polarization-maintaining optical fiber 1 is moved in the longitudinal direction (Z-axis direction) of the fiber 1, the X direction perpendicular to the Z-axis direction, and the θ direction as rotation about the Z-axis direction as the rotation axis. As shown in FIG. 3, the second polarization-maintaining optical fiber 2 is moved in the longitudinal direction (Z-axis direction) of the fiber 2, the Y-axis direction perpendicular to both the Z- and X-axis directions, and the θ direction as rotation about the Z-axis direction as the rotation axis.

When the fibers 1 and 2 are moved in this manner, they can be moved in the three-dimensional space.

How to obtain a transmitted optical image will be described in detail.

As shown in FIG. 4, the first and second transmitted optical images A and B are optical images that are transmitted through the first and second polarization-maintaining optical fibers 1 and 2. When obtaining these optical images, if the microscope 4a (television camera 4) is moved as shown in FIG. 8, transmitted optical images sensed from two directions can be obtained for one polarization-maintaining optical fiber.

Figure 8:
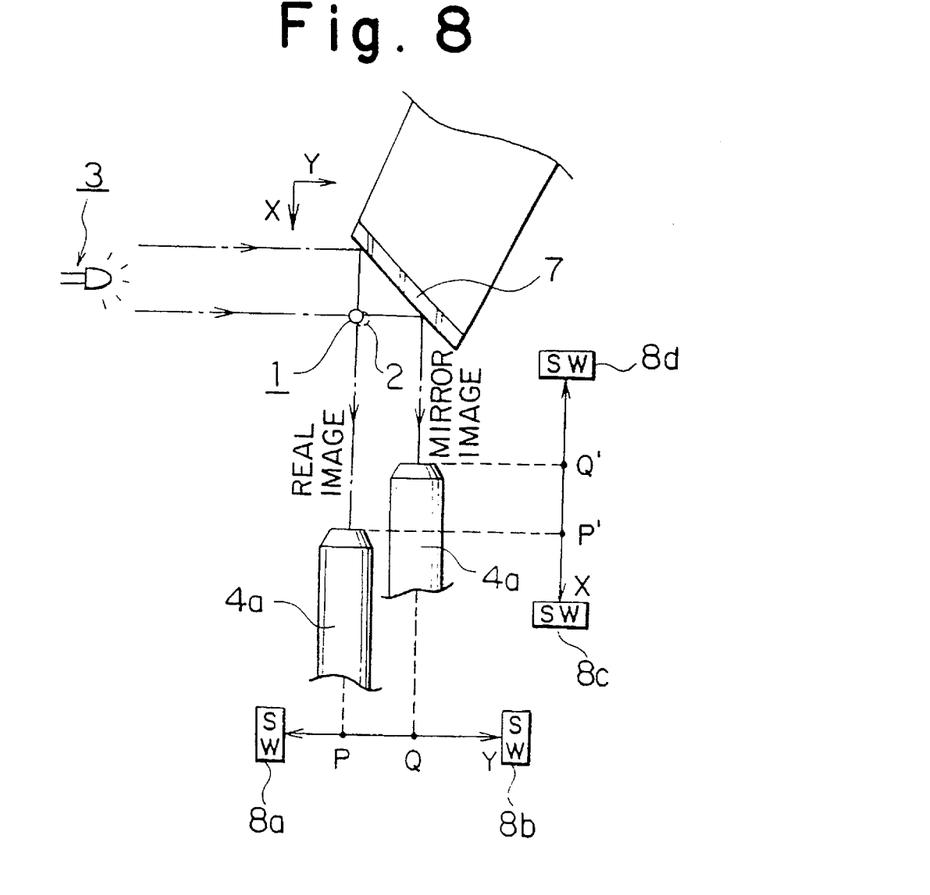
FIG. 8 shows part of the apparatus shown in FIG. 1A.

In this embodiment, as shown in FIG. 8, the polarization-maintaining optical fibers 1 and 2 are arranged to extend in a direction perpendicular to the surface of the sheet of the drawing. When the reflecting mirror 7 is used, as shown in FIG. 8, the two transmitted optical images (a real image and a mirror image) from the two directions can be obtained. More specifically, when the LED 3 and microscope 4a are arranged on a side of the polarization-maintaining optical fibers 1 and 2, as shown in FIGS. 1A and 8, and the microscope 4a is moved relative to the reflecting mirror 7, the real and mirror images of each of the polarization-maintaining optical fibers 1 and 2 can be caused to be incident on the microscope 4a.

The microscope 4a is moved by a general electric motor. The moving range of the microscope 4a is limited by limit switches 8a to 8d provided around the microscope 4a.

When the microscope 4a is arranged at the position of a point P of FIG. 8, a real image can be caused to be incident on the microscope 4a. When the microscope 4a is arranged at the position of a point Q of FIG. 8, a mirror image can be caused to be incident on the microscope 4a.

Figure 9A:
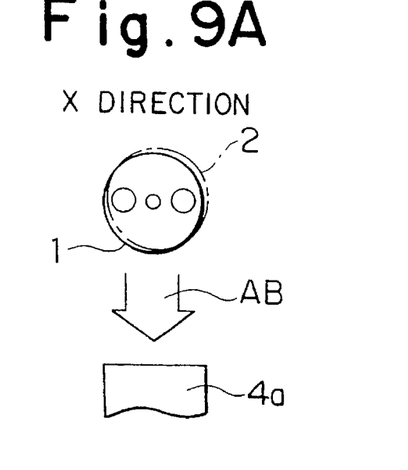
FIGS. 9A and 9B are diagrams for explaining how to sense a real image and a mirror image.
Figure 9B:
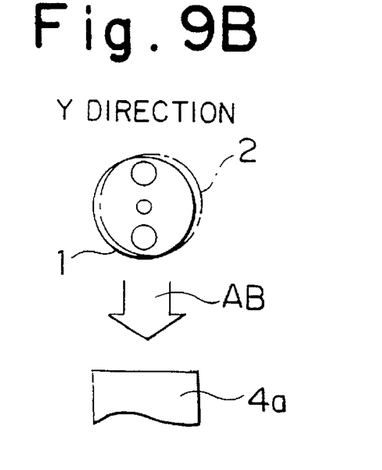

Therefore, as shown in FIG. 9A, an optical image AB of light irradiated toward the polarization-maintaining optical fibers 1 and 2 in the X-axis direction and transmitted through the polarization-maintaining optical fibers 1 and 2 is incident on the microscope 4a located at the point P. As shown in FIG. 9B, an optical image AB of light irradiated toward the polarization-maintaining optical fibers 1 and 2 in the Y-axis direction and transmitted through the polarization-maintaining optical fibers 1 and 2 is incident on the microscope 4a located at the point Q.

To align the polarization-maintaining optical fibers 1 and 2, while observing the transmitted optical images in the X direction, the optical fibers 1 and 2 are aligned in the X direction by setting the first and second values to be equal such that the positions of the luminance peaks displayed on the display 6 overlap. Thereafter, while observing the transmitted optical images in the Y direction, the optical fibers 1 and 2 are aligned in the Y direction by setting the first and second values to be equal such that the positions of the luminance peaks displayed on the display 6 overlap.

How to calculate the luminance peak position will be described in detail.

Figure 10:
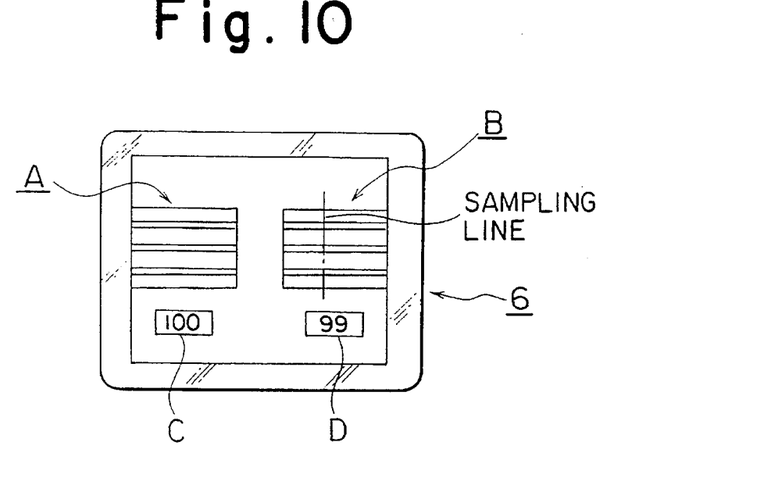
FIG. 10 shows a display displaying polarization-maintaining optical fibers and numerical values.
Figure 11:
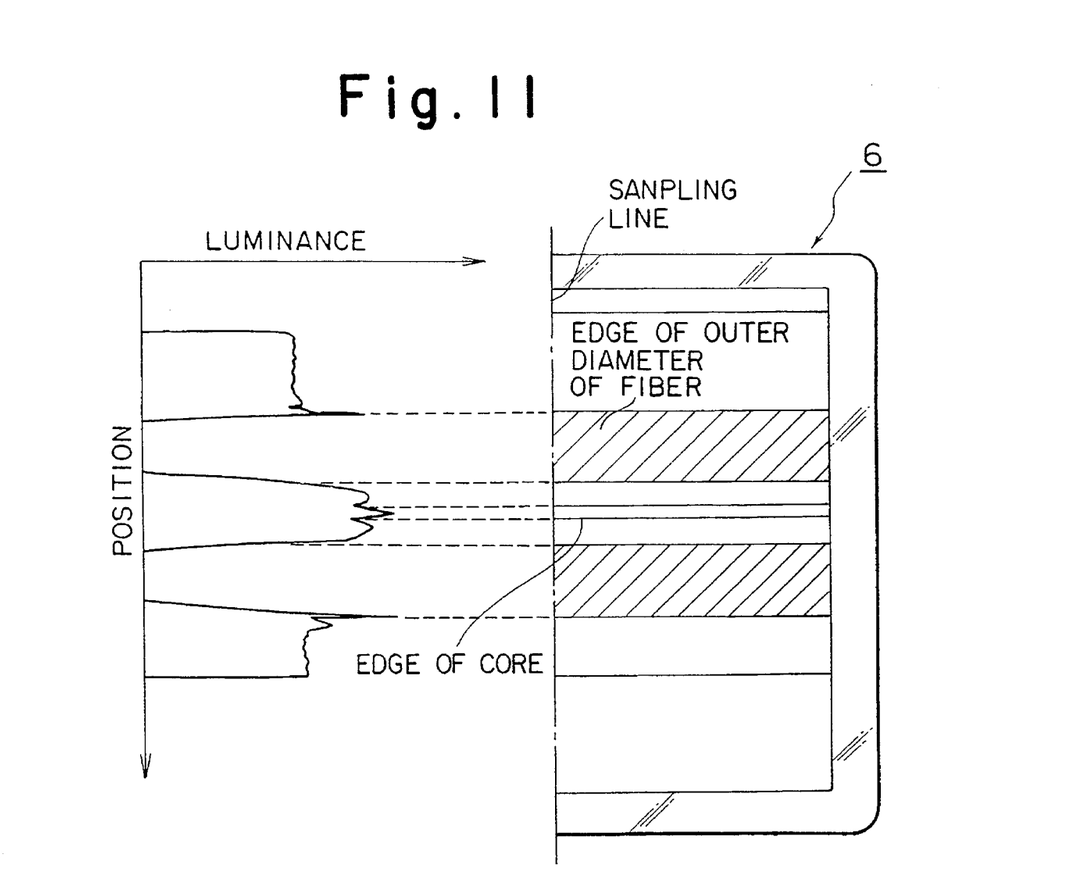
FIG. 11 shows the luminance distribution of a polarization-maintaining optical fiber on the display.

As shown in FIG. 10, the transmitted optical image A of the polarization-maintaining optical fiber 1 and the transmitted optical image B of the polarization-maintaining optical fiber 2 are displayed on the display 6. A sampling line is set in a direction perpendicular to the longitudinal direction of the transmitted optical image B, and the luminance distribution of the transmitted optical image B on this sampling line is measured. FIG. 11 is a graph for explaining the luminance distribution on the sampling line. As shown in FIG. 11, the luminance on the sampling line has peaks corresponding to the edge of the outer diameter of the fiber, and three peaks corresponding to the core and the stress applying members of the fiber. Since the position of a pixel on the display 6 can be processed in accordance with the address of an image memory in the image processing unit 5, the three luminance peak positions corresponding to the core and stress applying members can be detected by using the image processing unit 5.

Figure 12:
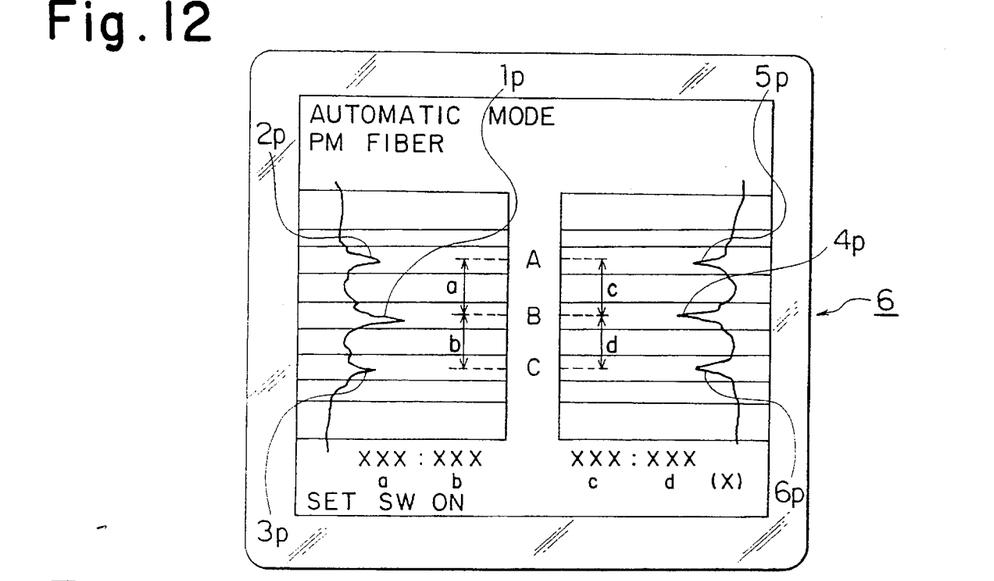
FIG. 12 is a display displaying polarization-maintaining optical fibers and numerical values.

As shown in FIG. 12, the three luminance peaks of the first transmitted optical image A are defined as first, second, and third peaks $1p$, $2p$, and $3p$, and the three luminance peaks of the second transmitted optical image B are defined as fourth, fifth, and sixth peaks $4p$, $5p$, and $6p$, respectively.

The distance between the first and second peaks $1p$ and $2p$ is "a", the distance between the first and third peaks $1p$ and $3p$ is "b", the distance between the fourth and fifth peaks $4p$ and $5p$ is "c", and the distance between the fourth and sixth peaks $4p$ and $6p$ is "d".

Figure 13:
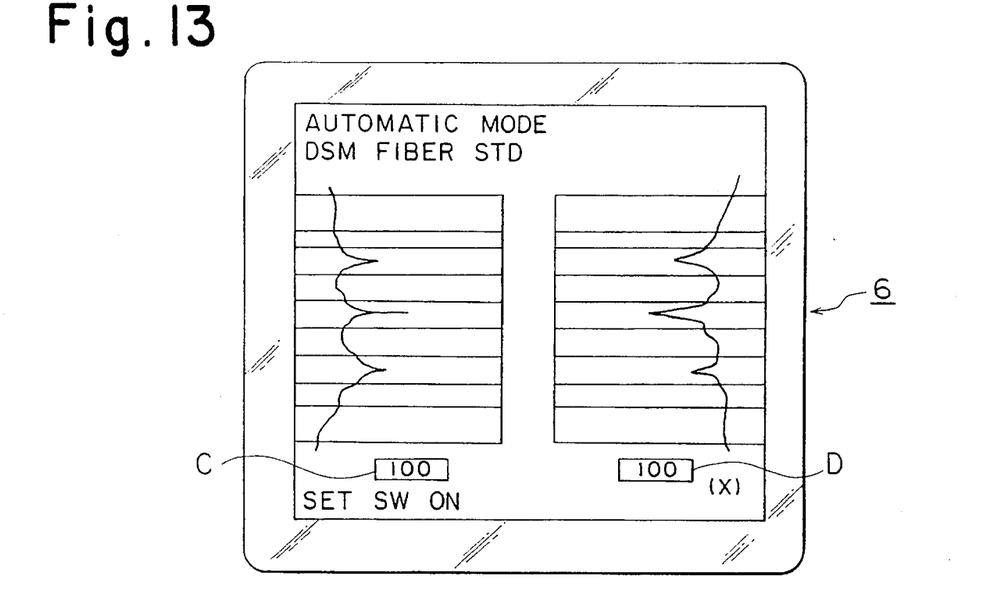
FIG. 13 is a display displaying polarization-maintaining optical fibers and numerical values.

These distances a to d are obtained by processing the luminance distribution of the transmitted optical image AB in the image processing unit 5, and are displayed on the lower area of the display 6. When these numerical values a to d calculated in the image processing unit 5 are displayed on the display 6, the operator can align the fibers 1 and 2 only by setting these numerical values a to d to satisfy a:b=c:d. Although this aligning method is good, the operator must recognize four different values in this case. Thus, to further improve the operational efficiency, a/b and c/d are calculated in the image processing unit 5, and the first and second values C and D obtained by these calculations are displayed on the display 6, as shown in FIG. 13. Then, the number of numerical values the operator need to recognize can be reduced to two, thus greatly increasing the operational efficiency of the operator.

After alignment in the X direction is performed in the above manner, alignment in the Y direction is performed in the same manner. Then, the optical axes of the first and second polarization-maintaining optical fibers 1 and 2 coincide with each other. In this embodiment, the first and second values C and D are displayed. However, a difference obtained by subtracting the second value D form the first value C may be displayed on the display 6. Regarding setting of the distances or distances a to d, a may be defined as the distance from the central position of the outer diameter of the polarization-maintaining optical fiber indicated on the left to the upper-side maximum luminance position, b may be defined as the distance from the central position of the outer diameter of the polarization-maintaining optical fiber indicated on the left to the lower-side maximum luminance position, c may be defined as the distance from the central position of the outer diameter of the polarization-maintaining optical fiber indicated on the right to the upper-side maximum luminance position, and d may be defined as the distance from the central position of the outer diameter of the polarization-maintaining optical fiber indicated on the right to the lower-side maximum luminance position. If a sensed optical image is out of focus, a numerical value completely different from that obtained when the optical image is focused will be displayed on the lower portion of the display 6. In this case, the focus is adjusted by changing the focal position of the microscope 4a.

After the polarization-maintaining optical fibers 1 and 2 are aligned in the above manner, their central cores are aligned. Then, power is supplied to the discharge electrodes 15a and 15b arranged in the vicinities of the end faces of the fibers, thereby fusion-splicing the polarization-maintaining optical fibers 1 and 2.

As has been described above, according to the present invention, the axes of polarization-maintaining optical fibers can be easily aligned by setting the first and second values displayed on the display to coincide with each other. Since a predetermined quantitative standard can be obtained in alignment of polarization-maintaining optical fibers, the spliced state of polarization-maintaining optical fibers will not differ from one operator to another.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.247853/1994 filed on Oct. 13, 1994 is hereby incorporated by reference.

What is claimed is:

1. A method of splicing a first polarization-maintaining optical fiber having a core and stress applying members and a second polarization-maintaining optical fiber having a core and stress applying members, comprising:

(a) arranging the first and second polarization-maintaining optical fibers such that end faces thereof oppose each other;

(b) irradiating light from a side of the first and second polarization-maintaining optical fibers;

(c) sensing a first transmitted optical image transmitted through the first polarization-maintaining optical fiber and a second transmitted optical image transmitted through the second polarization-maintaining optical fiber with a television camera, the first transmitted optical image having first, second, and third luminance peaks, and the second transmitted optical image having fourth, fifth, and sixth luminance peaks;

(d) obtaining positions of the first, second, third, fourth, fifth, and sixth luminance peaks based on a luminance signal of the first transmitted optical image output from said television camera;

(e) displaying a first value calculated from the positions of the first, second, and third luminance peaks on a display;

(f) displaying a second value calculated from the positions of the fourth, fifth, and sixth luminance peaks on said display;

(g) moving the first and second polarization-maintaining optical fibers such that the first and second values displayed on said display are equal; and (h) splicing the first and second polarization-maintaining optical fibers with each other after the step (g).

2. A method according to claim 1, wherein the first luminance peak corresponds to the core of the first polarization-maintaining optical fiber, the second and third luminance peaks respectively correspond to the stress applying members of the first polarization-maintaining optical fiber, the fourth luminance peak corresponds to the core of the second polarization-maintaining optical fiber, the fifth and sixths luminance peaks respectively correspond to the stress applying members of the second polarization-maintaining optical fiber, the first value is a/b, and the second value is c/d where a is a distance between the positions of the first and second luminance peaks, b is a distance between the positions of the first and third luminance peaks, c is a distance between the positions of the fourth and fifth luminance peaks, and d is a distance between the positions of the fourth and sixth luminance peaks.

3. An apparatus for splicing first and second polarization-maintaining optical fibers with each other, comprising (a) a television camera for sensing the first and second polarization-maintaining optical fibers, (b) an image processing unit, connected to said television camera, for detecting a plurality of luminance peak positions of an image of the first polarization-maintaining optical fiber sensed by said television camera and a plurality of luminance peak positions of an image of the second polarization-maintaining optical fiber sensed by said television camera, and outputting numerical values calculated from the peak positions and video signals output from said television camera upon superimposition, and (c) a display, connected to said image processing unit, for displaying a signal obtained by the superimposition.

4. An apparatus according to claim 3, further comprising a first rest table on which the first polarization-maintaining optical fiber is to be arranged along a Z-axis, a second rest table on which the second polarization-maintaining optical fiber is to be arranged along the Z-axis, means for rotating said first rest table about the Z-axis as the center, and means for rotating said second rest table about the Z-axis as the center.

5. An apparatus according to claim 3, further comprising a pair of discharge electrodes for fusion-splicing end faces of the first and second polarization-maintaining optical fibers with each other.

6. An apparatus according to claim 5, further comprising a discharge circuit for applying a voltage across said discharge electrodes.

7. An apparatus according to claim 3, further comprising a motor for moving said television camera.

8. An apparatus according to claim 3, further comprising a light source for irradiating light toward the first and second polarization-maintaining optical fibers, a mirror arranged such that end faces of the first and second polarization-maintaining optical fibers are located between said light source and said mirror, and a motor for moving said television camera.

9. A method of splicing a first polarization-maintaining optical fiber having a core and stress applying members and a second polarization-maintaining optical fiber having a core and stress applying members, comprising:

(a) arranging the first and second polarization-maintaining optical fibers such that end faces thereof oppose each other;

(b) irradiating light from a side of the first and second polarization-maintaining optical fibers;

(c) sensing a first transmitted optical image transmitted through the first polarization-maintaining optical fiber and a second transmitted optical image transmitted through the second polarization-maintaining optical fiber with a television camera, the first transmitted optical image having first, second, and third luminance peaks, and the second transmitted optical image having fourth, fifth, and sixth luminance peaks;

(d) obtaining positions of the first, second, third, fourth, fifth, and sixth luminance peaks based on a luminance signal of the first transmitted optical image output from said television camera;

(e) displaying a first value calculated from the positions of the first, second, and third luminance peaks on a display;

(f) displaying a second value calculated from the positions of the fourth, fifth, and sixth luminance peaks on said display;

(g) moving the first and second polarization-maintaining optical fibers to align the axes of the first and second polarization-maintaining fibers while observing the first and second values displayed on said display; and (h) splicing the first and second polarization-maintaining optical fibers with each other after the step (g).

10. A method according to claim 9, wherein said the first luminance peak corresponds to the core of the first polarization-maintaining optical fiber, the second and third luminance peaks respectively correspond to the stress applying members of the first polarization-maintaining optical fiber, the fourth luminance peak corresponds to the core of the second polarization-maintaining optical fiber, the fifth and sixths luminance peaks respectively correspond to the stress applying members of the second polarization-maintaining optical fiber, the value is a/b, and the second value is c/d where a is a distance between the positions of the first and second luminance peaks, b is a distance between the positions of the first and third luminance peaks, c is a distance between the positions of the fourth and fifth luminance peaks, and d is a distance between the positions of the fourth and sixth luminance peaks.

* * * * *